June 26, 1928.

T. M. LILLEBERG

PIPE MACHINE

Filed Feb. 21, 1927   5 Sheets-Sheet 1

1,675,182

Inventor:
Tideman M. Lilleberg,
By Dyrenforth, Lee, Chritton & Wiles
Atty's

June 26, 1928.

T. M. LILLEBERG

PIPE MACHINE

Filed Feb. 21, 1927

1,675,182

5 Sheets-Sheet 2

Inventor:
Tideman M. Lilleberg
By Dyrenforth, Lee, Chritton & Wiles
Attys

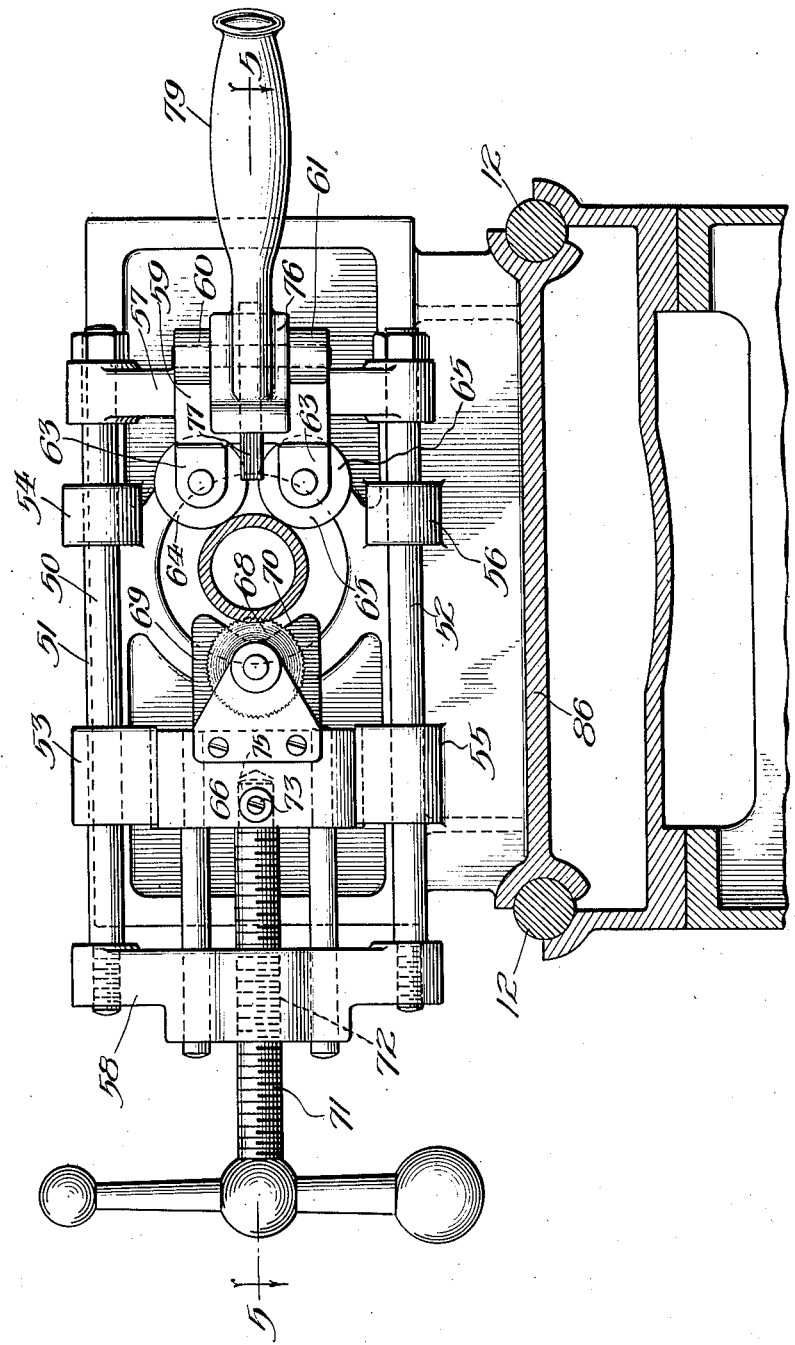

June 26, 1928.
T. M. LILLEBERG
PIPE MACHINE
Filed Feb. 21, 1927
1,675,182
5 Sheets-Sheet 4
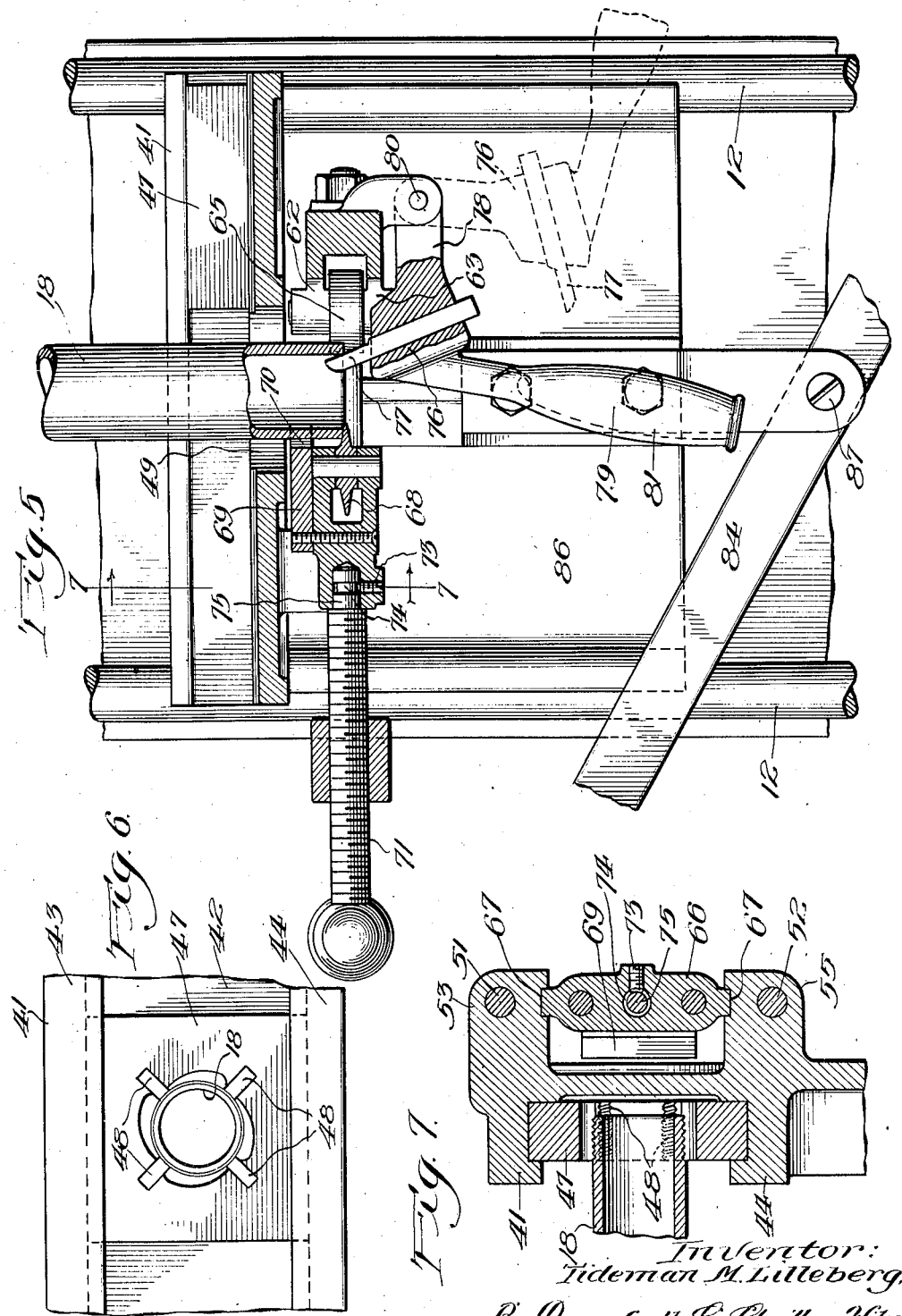

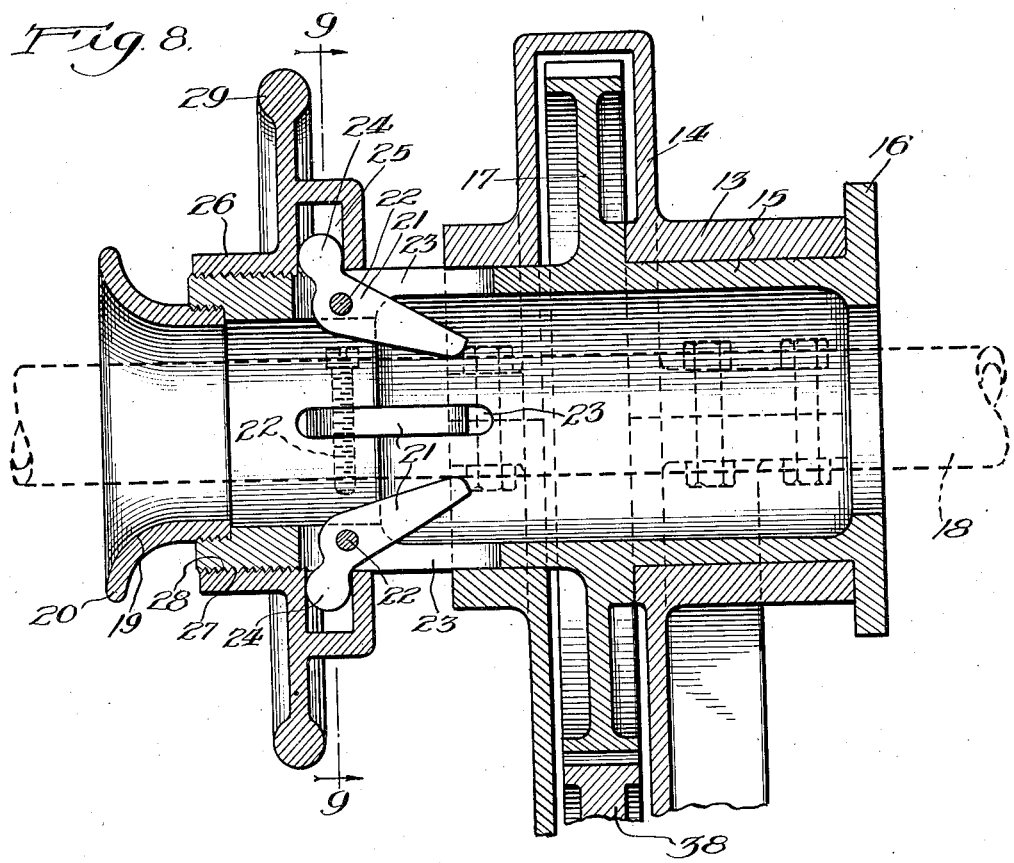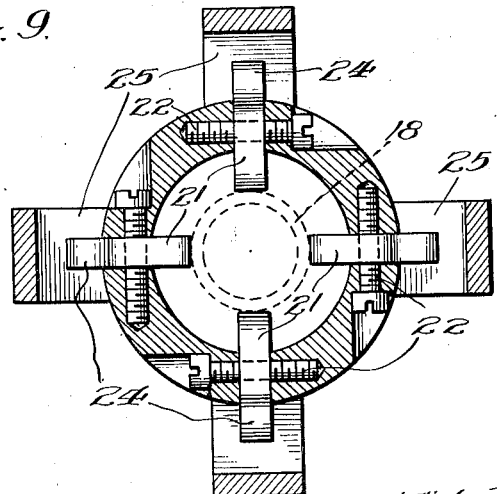

Patented June 26, 1928.

1,675,182

UNITED STATES PATENT OFFICE.

TIDEMAN M. LILLEBERG, OF CHICAGO, ILLINOIS, ASSIGNOR TO THE NYE TOOL & MACHINE WORKS, OF CHICAGO, ILLINOIS, A CORPORATION OF ILLINOIS.

PIPE MACHINE.

Application filed February 21, 1927. Serial No. 169,982.

One of my objects is to provide improvements in pipe machines adapted to thread or cut off the end of a pipe, or both, whereby the pipe may be readily introduced into the desired position in the machine and which is advantageous particularly where long pipes are to be operated on.

Another object is to provide novel, simple and positively operating mechanism for centering and clamping the pipe in such a machine.

Another object, and this particularly in a machine adapted to thread a pipe, is to provide improvements therein to the end that the length of the machine, and consequently its size, may be reduced, while maintaining the desired spread between the rotating head in which the pipe is secured, and the device by which the threads are produced on the pipe.

To provide mechanism for cutting off the end of a pipe which shall be so constructed that it is capable of movement with the pipe during the cutting operation, in the wobbling movement of the pipe which often results when the pipe is not perfectly true, whereby the cutting operation is rendered uniform throughout the circumference of the pipe.

Another object is to provide in a pipe cutting machine a novel and simple mechanism for removing the burr, if any, produced on the inner surface of the pipe in the cutting operation.

Another object is to provide in a pipe cutting machine, improved means for engaging the end of the pipe during the burr-removing operation; and other objects as will be manifest from the following description.

Referring to the accompanying drawings:—

Figure 1:
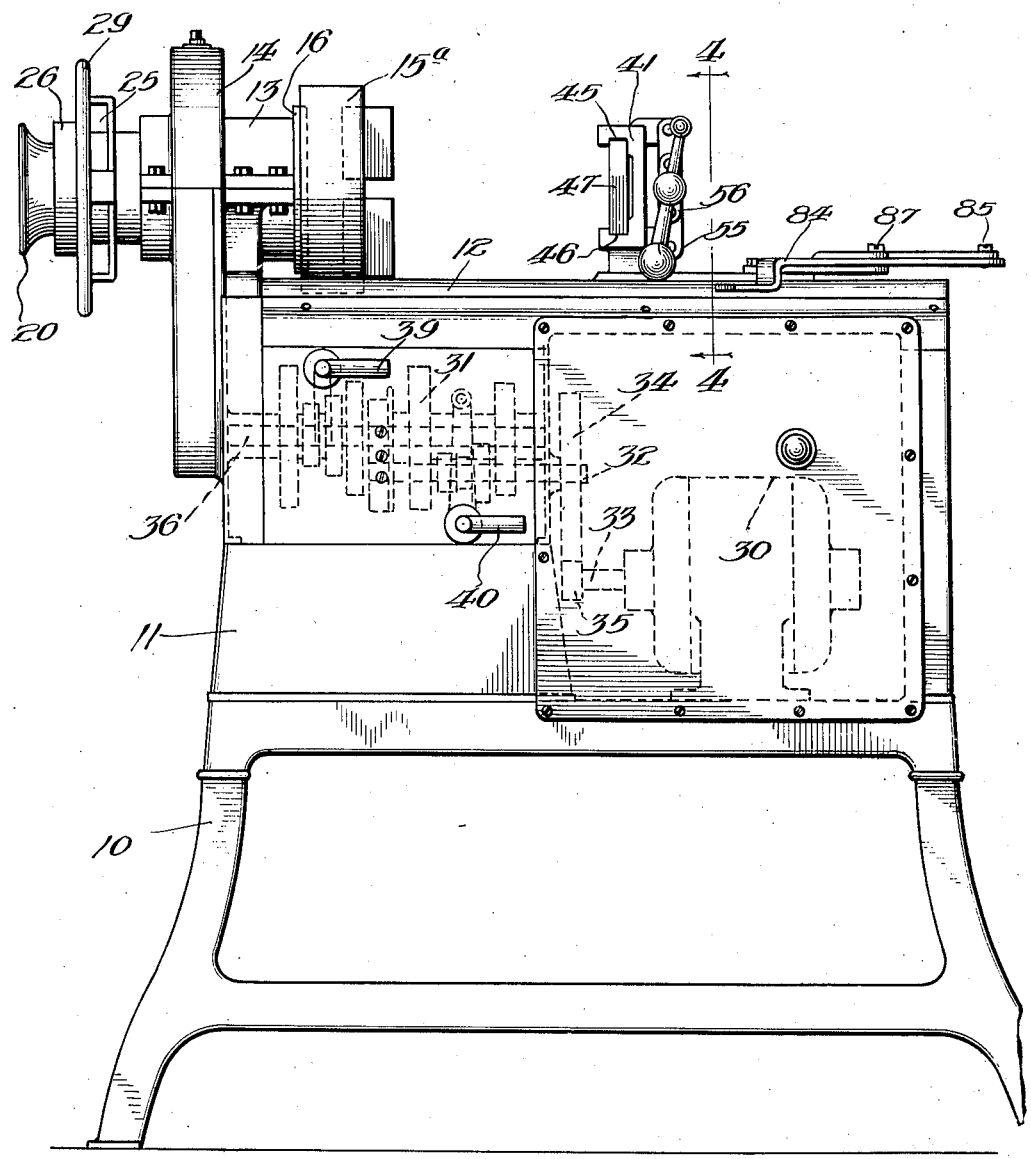
Figure 2:
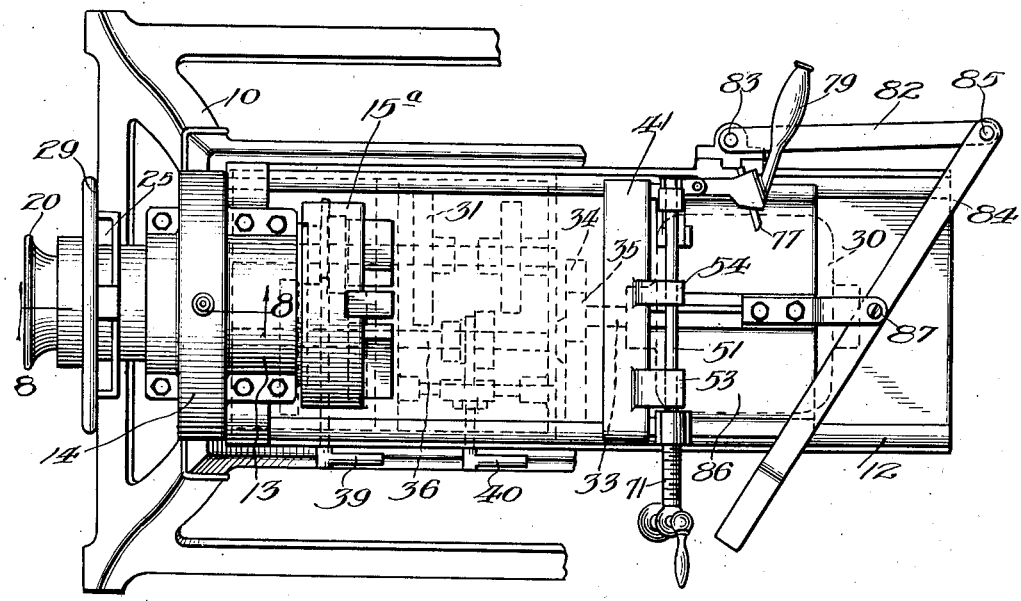
Figure 3:
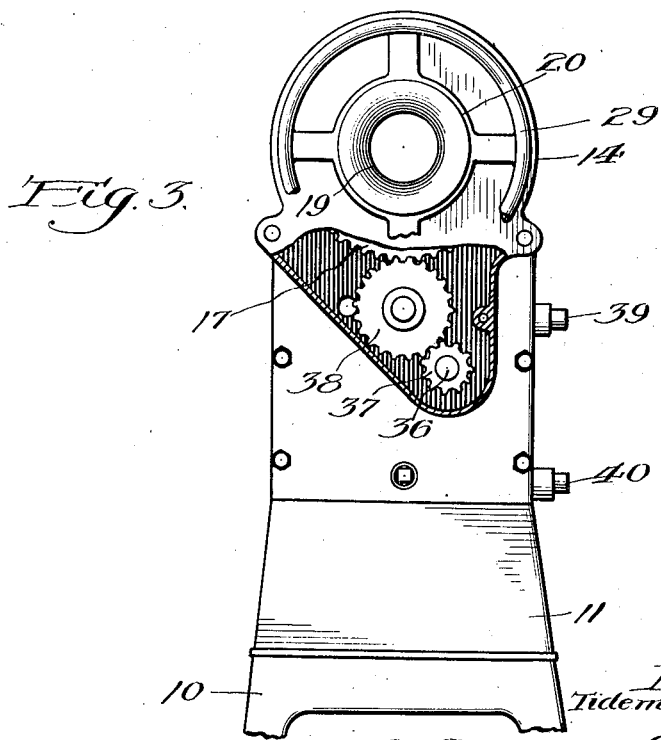

Figure 1 is a view in front elevation of a pipe threading and cutting machine constructed in accordance with my invention, certain parts being shown in dotted lines. Figure 2 is a broken plan view of the machine of Fig. 1. Fig. 3 is an end view of the machine of the preceding figures showing certain parts broken away and others sectioned, this view being taken from the left-hand end of Fig. 2. Figure 4 is an enlarged sectional view taken at the line 4—4 on Fig. 1 and viewed in the direction of the arrows, this view showing a pipe in place in the machine, and in the process of an end thereof being cut off. Figure 5 is a broken section taken at the line 5—5 on Fig. 4 and viewed in the direction of the arrows, this view showing the parts of the machine in the position they occupy after the end of the pipe has been cut off, the burr-removing device being shown by dotted lines in inoperative position and by full lines in the position it assumes during the operation of removing the burr. Figure 6 is a broken view in elevation of the die-supporting member, showing a die positioned therein and a pipe in the process of being threaded. Figure 7 is a view in longitudinal section of the die-holding and cutter-equipped portion of the machine, the die being shown positioned for threading a pipe, with the pipe being threaded therein, and the section for the remaining parts being taken at the line 7 on Fig. 5 and viewed in the direction of the arrow. Figure 8 is a broken, enlarged section taken at the line 8 on Fig. 2 and viewed in the direction of the arrow, the chuck being removed and a pipe to be threaded shown by dotted lines in position in the machine; and Figure 9, a section taken at the line 9—9 on Fig. 8 and viewed in the direction of the arrows.

The machine shown comprises a frame structure 10 at which the machine is supported, this frame being surmounted by a housing structure 11 provided at its upper surface with spaced parallel guide rods 12 located at the front and rear margins of the housing.

Rising from the housing, is a journal bearing 13 containing between its ends a circumferential hollow extension 14. Rotatably mounted in the journal 13 is a tubular head 15 provided at one end with a circumferential outwardly extending flange 16 overlapping one end of the journal bearing 13 and between its ends with a gear 17 located in the housing 14, the end of the head 15 provided with the flange 16 being provided with chuck mechanism 15ª of any desirable construction, rigidly secured thereto and adapted to clamp a pipe such as that represented at 18 in centralized position relative to the head 15. The opposite end of this tubular head is provided with an internally flared portion 19 shown as provided on a member separate from the body of the head and represented at 20, this member being screwed into the open end of the head.

The head 15 is provided with an auxiliary pipe-centering and clamping mechanism comprising a plurality of fingers 21 disposed radially about the longitudinal axis of the head and pivoted thereto at 22 to adapt them to be rocked in radial slots 23 in the side wall of the head, these fingers being provided with rounded extensions 24 extending at an angle to the main portions of these fingers and located in an annular groove 25 provided about the inner side of a ring member 26 having threaded connection at internal threads 27 thereon with the externally threaded portion 28 of the head 15, the ring 26 being provided with a hand wheel portion 29 by which it may be rotated on the head. By providing engagement between the fingers 21 and the ring member 26 as stated, these fingers are rocked in one direction or the other depending upon the direction of rotation of the member 26, to simultaneously move the inner ends of these fingers relative to each other, rotation of the member 26 in clockwise direction in Fig. 9 operating to move the inner ends of the fingers 21 inwardly toward the longitudinal axis of the head and reverse rotation of this member moving them in the opposite direction.

In the particular machine illustrated which is shown as driven by a self-contained power device, such as the reversible electric motor represented at 30, this power device together with speed changing mechanism for driving the head at different speeds forward and in reverse direction as desired, are located within the housing 11, the speed changing mechanism which may be of any suitable construction being represented at 31 and operatively connected at its drive shaft 32 with the armature shaft 33 of the motor by means of the gears 34 and 35. The driven shaft of this speed changing mechanism and represented at 36 is provided with a gear 37 located within the housing 14 and meshing with an intermediate gear 38 also located in this housing and meshing with the gear 17. The speed-change levers are represented at 39 and 40.

The mechanism for cutting off the end of the pipe to be threaded and threading the same, comprises a head 41 mounted on the guide rods 12 and confined thereon to be slidable lengthwise of the machine. This head is formed of a plate portion 42 extending crosswise of the machine and having upper and lower spaced parallel flange portions 43 and 44 extending in a direction toward the head 15 and containing grooves 45 and 46 forming guide-ways to receive a threading die, such as that represented at 47 and which latter is slidable in these grooves from a position in which it extends wholly to one side of a pipe in the machine, as shown in Fig. 5, to a position in which its pipe threading elements 48 extend in alignment with an opening 49 in the plate 43 and with the pipe to be threaded (Figs. 6 and 7).

The mechanism now being described also comprises a frame 50 formed of upper and lower parallel rods 51 and 52 which are slidable in upper bosses 53 and 54 and in lower bosses 55 and 56 formed on the head 41, and cross members 57 and 58 rigidly connected with the rods 50 and 52. The cross member 57 is formed with an enlargement 59 carrying upper and lower spaced-apart ears 60 and 61 at one end thereof and sets of horizontally spaced apart ears 62 and 63 located above and below the axis of the head 15 and in which rollers 64 and 65 are journalled to form anti-friction abutments against which the side of the pipe to be cut and the burr produced in cutting removed, bears, as shown in Figs. 4 and 5.

The mechanism also comprises a slide 66 which is guided for movement transversely of the machine, in guide-ways 67 provided in these bosses, this slide having journalled thereon a serrated cutter disk 68 which extends at the side of the pipe opposite that engaged by the rollers 64 and 65, and in line with these rollers transversely of the machine. The slide 66 is also provided with a member, shown as a plate 69, which extends crosswise of the machine and between the cutter 68 and the head 15 and is provided with a substantially V-shaped recess 70 forming a jaw at which this plate is adapted to bear against the pipe opposite the side thereof engaged by the rollers 64 and 65.

Means are provided for adjusting the slide 66 toward and away from the rollers 64 and 65, under the control of the operator, these means in the construction shown comprising a feed-screw 71 having threaded engagement with the cross member 58 at a threaded opening 72 therein with its inner end swiveled in the slide 66, a pin 73 in the slide 66 and projecting into an annular groove 74 in the reduced unthreaded end 75 of the feed-screw 71, permitting rotation of the feed-screw relative to the slide, while compelling lengthwise movement of the latter responsive to the corresponding movement of the feed-screw 71.

The mechanism also comprises means for removing the burr produced on the inner edge of the pipe by the cutting operation, these means comprising a holder 76 for a reaming tool 77, this holder being shown as in the form of a lever presenting angularly disposed arms 78 and 79, the arm 78 carrying the tool 77 and being pivotally connected at 80 to the ears 60 and 61 to cause the tool 77 to be positioned in a plane midway between the axes of the rollers 64 and 65, the other arm 79 being provided with a handle portion 81 by which the operator may swing the holder 76 into and out of a position for engaging the tool 77 with the pipe, the holder being shown by dotted lines in outwardly swung position in Fig. 5 and by full lines in a position in which the tool 77 operates against the pipe.

In the particular illustrated embodiment of my invention the head 41 is shifted on the guide-ways 12 manually into the different desired positions, by means of lever mechanism comprising a link 82 pivotally connected at one end to a stationary portion of the machine, as represented at 83 and pivotally connected at its opposite end with the rear end of a lever 84, as represented at 85, the lever 84, which extends generally crosswise of the machine and above the guide-ways 12, being pivotally connected between its ends to the base portion 86 of the head 41, as represented at 87, it being understood that the operator, by grasping the forward end of the lever 84, may shift the head 41 in any desired position along the guideway.

The operation of the machine is as follows: The operator introduces the end of the pipe 18 to be operated on, into the head 15 the outwardly flared portion 19 of the head aiding in thus introducing the pipe into the head, and slides it between the guide fingers 21 and into and through the chuck 15ª, the guide fingers operating to prevent the end of the pipe from striking the chuck mechanism, these fingers being preferably tightened upon the pipe after thus positioning the latter, by screwing up the actuating ring 26. In practice the operator in removing the pipe from the machine after it has been cut and threaded, would operate the ring 26 only to such an extent as to cause the fingers 21 to release their grip on the pipe so that in putting another pipe into the machine these fingers would be in such position as to properly guide the pipe through the chuck.

The operator having conditioned the motor and transmission mechanism for rotating the pipe in clockwise direction in Fig. 9 at relatively high speed shifts the head 41 toward the head 15 to cause the end of the pipe to be operated on to extend into the space between the rollers 64 and 65 and the cutter 68. He then turns up the feed screw 71 to feed the cutter against the side of the rotating pipe and gradually feeds in the cutter, until it has cut through the entire side wall of the pipe. He continues to feed the slide 66 inwardly until the jaw portion 70 thereof bears against the side of the pipe and thereupon swings the holder 76 from the dotted position shown in Fig. 5 to the full line position shown in this figure to effect the removal of the burr produced by the cutting operation described on the inner edge portion of the pipe by the action of the sharpened lower edge of the tool 77.

Upon completing these operations he retracts the slide 66 and shifts the head 41 to the right in Fig. 1 to a position beyond this end of the pipe and then shifts the threading die 47 from the position shown in Fig. 5 to the position shown in Fig. 6 in which position its threading elements 48 extend concentric with the end of the pipe. He then conditions the transmission mechanism to rotate the pipe in clockwise direction in Fig. 9 at relatively slow speed and then shifts the head 41 to the left in Fig. 1 to a position in which the end of the pipe extends into the threading die, the operator applying continued pressure to the head 41 through the lever mechanism described for ensuring the proper cutting of the thread on the pipe. Upon completing this thread-cutting operation, the operator, when the die 47 is of the non-opening type as shown, reverses the motor for unscrewing the pipe from the threading die.

One of the principal features of my improved machine is that of mounting the cutter and its feeding means, together with the abutment for the opposite side of the pipe, on a member which is free to shift crosswise of the pipe without disturbing the relative positions of the cutter and abutment. This feature is of great advantage inasmuch as the pipe at the end thereof protruding from the chuck does not run true, but has a wobbling motion and this motion is compensated for by permitting the cutter and abutment to shift with the pipe thereby ensuring the uniform cutting of the pipe and avoiding undue stresses on this mechanism.

Furthermore, by mounting the reaming tool on this crosswise shiftable member this tool and the abutment cooperating therewith, as also the jaw member 70 may shift laterally with the pipe ensuring the uniform trimming of the inner edge of the pipe without undue stress on the mechanism, the jaw 70 operating to steady the pipe in this burr-removing operation.

It will be noted from the foregoing that by locating the gear transmission mechanism in a plane below the heads 15 and 41 and providing for the drive of the head 15 from the transmission mechanism as shown and described, the chuck mechanism 15ª may extend relatively close to the adjacent end of the machine which permits the machine to be made of relatively short length, with consequent economy and still afford the desired degree of adjustment of the cutting and threading mechanism in a direction lengthwise of the machine to and from the pipe-rotating head.

It will also be noted that by mounting the threading die for slidable movement in its support during the thread cutting operation, the die may shift laterally with the pipe where the latter does not run true, with the manifest advantage.

While I have illustrated and described my improvements as embodied in a particular construction of machine, I do not wish to be understood as intending to limit my invention thereto, as the same may be variously modified and altered without departing from the spirit of my invention.

What I claim as new, and desire to secure by Letters Patent, is:

1. In a pipe-cutting machine, the combination of means for rotating the pipe, and pipe-cutting means comprising a support formed of vertically spaced guides located above and below, respectively, the axis of a pipe mounted in said first-named means, a member formed of relatively movable sections one of said sections comprising upper and lower parallel rods slidably engaging said guides and cross members connecting said rods together, said section being movable crosswise of the pipe in the cutting operation, the other of said sections being mounted on said frame for movement lengthwise of the latter, a cutter element on one of said sections at one side of the pipe, an abutment on the other of said sections at the opposite side of the pipe, and means coacting with both sections for moving said abutment and cutter toward each other.

2. In a pipe-cutting machine, the combination of means for rotating the pipe, and pipe-cutting means comprising a support formed of vertically spaced guides located above and below, respectively, the axis of a pipe mounted in said first-named means, a member formed of relatively movable sections one of said sections comprising upper and lower parallel rods slidably engaging said guides and cross members connecting said rods together, said sections being movable crosswise of the pipe in the cutting operation, the other of said sections being mounted on said frame for movement lengthwise of the latter, a cutter element on one of said sections at one side of the pipe, an abutment on the other of said sections at the opposite side of the pipe, and means coacting with both sections for moving said abutment and cutter toward each other, said member being free to shift bodily with the pipe in a direction crosswise of the latter in the cutting operation.

3. In a pipe-cutting machine, the combination of means for rotating the pipe, and pipe-cutting means comprising a support formed of vertically spaced guides located above and below, respectively, the axis of a pipe mounted in said first-named means, a member formed of relatively movable sections one of said sections comprising upper and lower parallel rods slidably engaging said guides and cross members connecting said rods together, said sections being movable crosswise of the pipe in the cutting operation, the other of said sections being mounted on said frame for movement lengthwise of the latter, a cutter element on one of said sections at one side of the pipe and having sliding engagement with certain of said guides, an abutment on the other of said sections at the opposite side of the pipe, and means coacting with both sections for moving said abutment and cutter toward each other, said member being free to shift bodily with the pipe in a direction crosswise of the latter in the cutting operation.

TIDEMAN M. LILLEBERG.